United States Patent
Lawrence

(10) Patent No.: US 12,151,342 B2
(45) Date of Patent: Nov. 26, 2024

(54) TOOL ADAPTER WITH A SLIDABLE COLLAR AND A PLURALITY OF SOCKET ADAPTERS

(71) Applicant: Gladston Lawrence, Ft. Lauderdale, FL (US)

(72) Inventor: Gladston Lawrence, Ft. Lauderdale, FL (US)

( * ) Notice: Subject to any disclaimer, the term of this patent is extended or adjusted under 35 U.S.C. 154(b) by 568 days.

(21) Appl. No.: 17/478,020

(22) Filed: Sep. 17, 2021

(65) Prior Publication Data

US 2022/0080562 A1    Mar. 17, 2022

Related U.S. Application Data

(60) Provisional application No. 63/079,515, filed on Sep. 17, 2020.

(51) Int. Cl.
*B25B 21/00* (2006.01)
*B25B 23/00* (2006.01)

(52) U.S. Cl.
CPC ........ *B25B 21/007* (2013.01); *B25B 23/0035* (2013.01); *B23B 2231/04* (2013.01); *Y10T 279/17008* (2015.01)

(58) Field of Classification Search
CPC .............. B25B 21/007; B25B 23/0035; B23B 2231/04; Y10T 279/17008; Y10T 279/3406; Y10T 279/3412; Y10T 279/3418
See application file for complete search history.

(56) References Cited

U.S. PATENT DOCUMENTS

| 4,750,750 A | 6/1988 | Batalorf |
| 4,791,690 A | 12/1988 | Kuang-Wu |
| 4,818,157 A | 4/1989 | Kouvelis |
| 5,950,507 A | 9/1999 | Wolfe |
| 6,877,937 B2 * | 4/2005 | Hsiao ........................ B25F 3/00 408/238 |
| 7,237,987 B2 * | 7/2007 | Hernandez, Jr. .... B23B 31/2012 408/239 R |
| 7,404,563 B2 * | 7/2008 | Hernandez, Jr. ........ B23B 51/08 408/239 R |
| 8,739,340 B1 * | 6/2014 | Jagosh ...................... B25F 1/04 7/168 |

(Continued)

FOREIGN PATENT DOCUMENTS

DE         20212225 U1 *  10/2002  .......... B25B 15/001

*Primary Examiner* — Eric A. Gates
(74) *Attorney, Agent, or Firm* — Boudwin Intellectual Property Law, LLC; Daniel Boudwin

(57) ABSTRACT

A tool adapter with a collar and a plurality of socket adapters is provided. The device includes an elongated shaft having an attaching end and a working end. A spring partially encircles the elongated shaft and is coupled to a collar. The spring biases the collar towards the working end of the elongated shaft. The collar is slidable along the elongated shaft. The collar partially encases a pivoting connector. The plurality of socket adapters is disposed on the pivoting connector. One or more removable locking pins secures the collar in position over the pivoting connector. A pair of parallel arms are disposed on opposing sides of the working end. The pivoting connector may freely rotate between a pair of parallel arms at a connecting point when the collar is slid towards the attaching end.

6 Claims, 4 Drawing Sheets

(56) References Cited

U.S. PATENT DOCUMENTS

2004/0040422 A1* 3/2004 Chuang .............. B25B 23/0035
81/177.2
2012/0074659 A1 3/2012 Fanourgiakis et al.
2013/0330140 A1* 12/2013 Shiao .................. B25B 23/0035
408/226

* cited by examiner

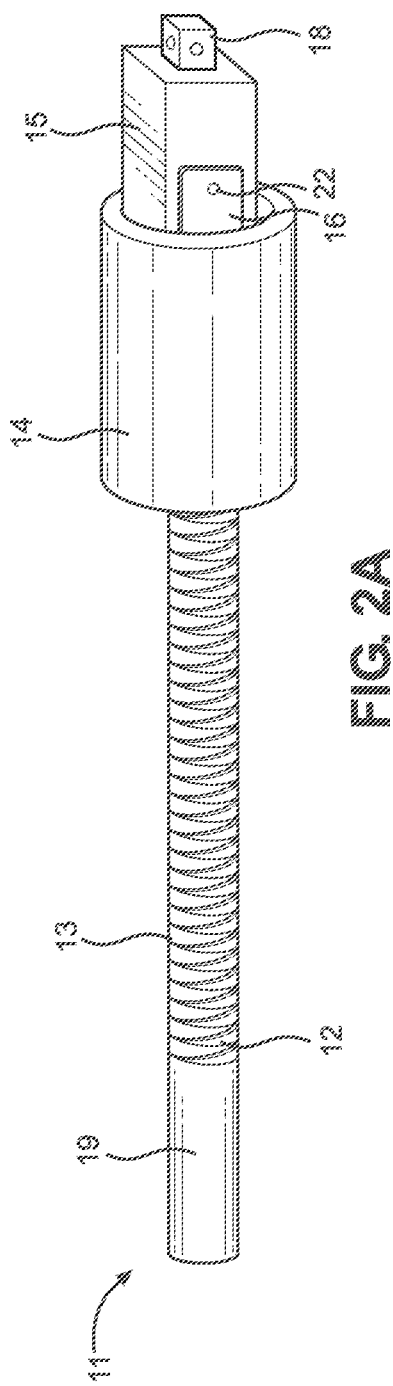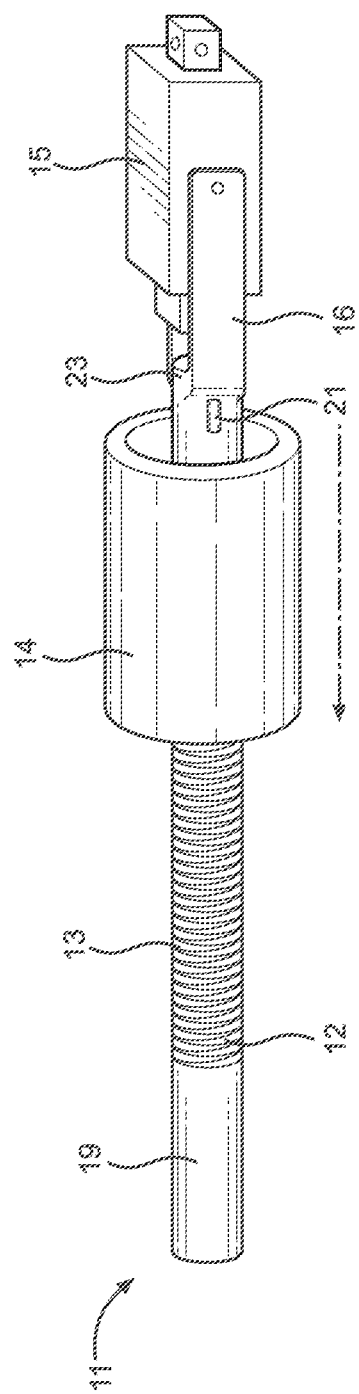

TOOL ADAPTER WITH A SLIDABLE COLLAR AND A PLURALITY OF SOCKET ADAPTERS

CROSS REFERENCE TO RELATED APPLICATIONS

This application claims the benefit of U.S. Provisional Application No. 63/079,515 filed on Sep. 17, 2020. The above identified patent application is herein incorporated by reference in its entirety to provide continuity of disclosure.

BACKGROUND OF THE INVENTION

The present invention relates to a tool adapter. More specifically, the present invention provides a tool adapter that includes a slidable collar that partially covers a pivoting connector with a pair of opposing socket adapters.

Many individuals utilize power tools to aid in the completion of construction projects. Unfortunately, a drawback to such power tools is that many are only capable of performing a single task. The power tools lack the ability to be adjusted to fit types of sockets or other tools. Tools that only possess a singular purpose are also present in more general tools, such as wrenches and other manually operated drivers. For example, most socket wrench tool sets include a single wrench with one kind of connector for connecting the included sockets. This can be severely limiting to the users of the tools. Oftentimes the user will have to either transport additional wrenches that can use other types of connectors, or if the wrench is able to accommodate for more than one connector, then the users will have to transport an abundance of connectors.

For individuals that use tools regularly throughout the day or have to be in a particular area for long periods of time while they work, they are limited in the amount of tools that they can carry and have access to at once. Wrenches and other tools often lack the adjustability needed to complete complex tasks. Oftentimes the individual must have multiple wrenches and socket sets to complete a project because they may be uncertain on which specific size of the tool they will need. The number of tools a user must carry takes up valuable space in both the user's tool transporting container and vehicle. Typically, for transporting an overwhelming number of tools and equipment, the user will have to make appropriate alterations to the vehicle to accommodate for their equipment. Such alterations often can affect the aesthetics of the vehicle and alter the function of storage areas within the vehicle. Moreover, the individual often carries the tools from their vehicle to the site of the job in a designated container. Since such containers have limited storage space, requiring the individual to carry the additional number of tools to be prepared for anything they might encounter on the job site may be cumbersome for the individual. Thus, having tools that are adaptable will enable the individual user to have to transport less tools at one time.

Unfortunately, devices that relate to providing adaptability to the users, specifically for socket adapters for power tools, typically are fixed in both length and angle. Such rigidness of the devices prohibits the user to easily adjust the tool for the specific job that requires the device. This often requires the user to contort the tool and their body in such a way to accommodate for the specific job. Additionally, the currently available devices are often only allowed one size or type of socket to be attached. This results in the user having to carry a high number of different attachments that will allow for the socket adapter to be utilized.

Therefore, there is a defined need amongst the known prior art references for a provides a tool adapter that includes a pivoting connector that contains more than one different sized socket adapters that will allow the user to utilize the same tool for multiple tasks and that limit the number of tools that one individual is required to transport.

SUMMARY OF THE INVENTION

In view of the foregoing disadvantages inherent in the types of tool adapters now present in the known art, the present invention provides a new tool adapter wherein a notched, spring surrounded elongated shaft and at least one locking pin affixed between a pair of parallel arms that secures a desired socket to the socket adapter.

It is therefore an object of the present invention to provide a collar that is slidable along an elongated shaft. In use, the collar will encase the adapter that is in an unusable position. To alternate the position of the adapters, the collar will slide along the elongated shaft. When the collar is slid along the elongated shaft, the spring will compress. When the spring is compressed, the user may alternate the specific adapter that they intend to use by manually rotating the connector. Then when the desired adapter is in the proper useable position, the user will release the collar and the spring will retract and move the collar over the unused adapter. The quick action and ease of use of the sliding collar will allow the user to quickly alternate between the desired adapter on a single tool. This will not only speed up the time it takes the user to complete the job, but also allows them to transport a single tool that is capable of performing more than one function.

Another aspect of the present invention is to provide at least one locking pin affixed between a pair of parallel arms that secures a desired socket to the socket adapter. The at least one locking pin secures the collar in place to operate the tool adapter. While the tool adapter is coupled to a power tool, the user will not want the collar to adjust while they attempting to use the adapter. If the collar were to move during use of the tool adapter, then the specific adapter may have undesired movement that will disturb the user and interrupt their ability to timely complete the job.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 2A shows a perspective view of an embodiment of the tool adapter with the collar in a locked position.

FIG. 2B shows a perspective view of an embodiment of the tool adapter with the collar in a detached position.

DETAILED DESCRIPTION OF THE INVENTION

Figure 1:
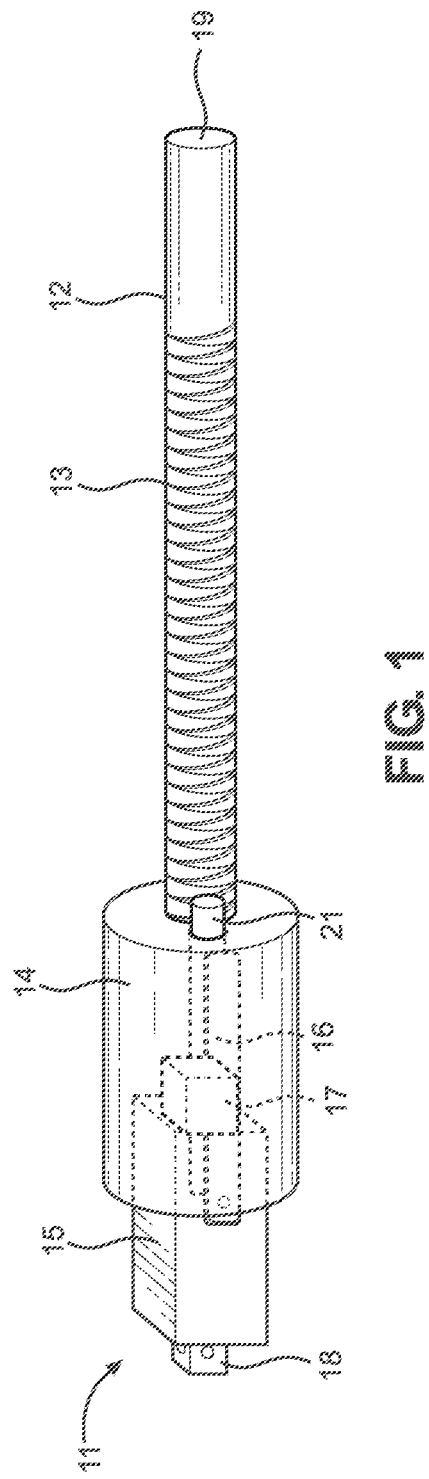
FIG. 1 shows a partial internal view of an embodiment of the tool adapter.

Reference is made herein to the attached drawings. Like reference numerals are used throughout the drawings to depict like or similar elements of the tool adapter. For the purposes of presenting a brief and clear description of the present invention, the preferred embodiment will be discussed is the tool adapter with a pivoting connector with a pair of socket adapters. The figures are intended for representative purposes only and should not be limiting in any respect.

FIG. 1 shows a partial internal view of an embodiment of a tool adapter. The tool adapter 11 comprises an elongated shaft 12 and a collar 14. The elongated shaft 12 includes a working end and an attaching end 19. A spring 13 encases the elongated shaft 12. The collar 14 encircles the elongated shaft 12. The collar 14 is coupled with the spring 13. The spring 13 biases the collar 14 towards the working end of the elongated shaft 12. A pair of parallel arms 16 are disposed on opposing ends of the working end of the elongated shaft 12. The collar 14 further comprises a base, an open end, and a sidewall. The base of the collar 14 is oriented towards the spring 13. One or more removable locking pins 21 secure the collar 14 in a locked position. The base of the collar 14 further comprises a plurality of apertures disposed thereon. A first aperture disposed on the base of the collar 14 encircles the elongated shaft 12. A second aperture disposed on the base of the collar 14 is configured to receive a first removable locking pin. A third aperture disposed on the base of the collar 14 is configured to receive a second removable locking pin. The collar 14 may engage with the one or more removable locking pins 21 to maintain the position and prevent the spring 13 from undesirably moving the collar 14. The one or more removable locking pins 21 are coupled with the working end of the elongated shaft 12. These one or more removable locking pins 21 maintain the elongated shaft 12 and useable socket adapter in a linear alignment.

A distal end of each parallel arm 16 includes a connecting point. The connecting point secures a pivoting connector 15. The pivoting connector 15 is sandwiched between the pair of parallel arms 16. The pivoting connector 15 includes two opposing ends. A first end includes a first socket adapter 18. A second end includes a second socket adapter 17. The first socket adapter 18 and the second socket adapter 17 are compatible for different sizes of sockets. In one embodiment, the first socket adapter 18 is compatible with a ¼-inch socket and the second socket adapter 17 is compatible with a ⅜-inch socket.

FIG. 2A shows a perspective view of an embodiment of the tool adapter with the collar in a locked position. The tool adapter 11 includes the elongated shaft 12 that is encased in the spring 13. The attaching end 19 engages with a power tool. The attaching end 19 allows a user to connect the tool adapter 11 to a power tool to operate the tool adapter 11 with high speed and torque. The ability to attach the tool adapter 11 to a power tool provides the user with the ability to loosen or tighten a bolt or nut efficiently and swiftly. In one embodiment, the attaching end 19 includes a hexagonal shape. The hexagonal shaped attaching end 19 will be for a specific type of power tool. In another embodiment, the attaching end 19 includes one or more notches. The one or more notched attaching end 19 will be for a specific type of power tool. The pivoting connector 15 is secured to the pair of parallel arms 16 at the connecting point 22. The pivoting connector 15 rotates about the connecting point 22. The collar 14 covers a portion of the working end of the elongated shaft 12 and the unused socket adapter. The collar 14, along with the one or more removable locking pins, will prevent the pivoting connector 15 from experiencing any undesired movement. In the shown embodiment, the pivoting connector 15 is secured in the collar 14 with the first socket adapter 18 positioned for use.

FIG. 2B shows a perspective view of an embodiment of the tool adapter with the collar in a detached position. The collar 14 of the tool adapter 11 will disengage with the one or more removable locking pins 21. The collar 14 may slide along the elongated shaft 12 towards the attaching end 19. When the collar 14 slides towards the attaching end 19, the spring 13 will compress. After the collar 14 is slid towards the attaching end 19, the entire pivoting connector 15 and the pair of parallel arms 16 will be exposed. A neck 23 is disposed on the working end of the elongating shaft 12. The pair of parallel arms 16 extend outward from the neck 23.

Figure 2C:
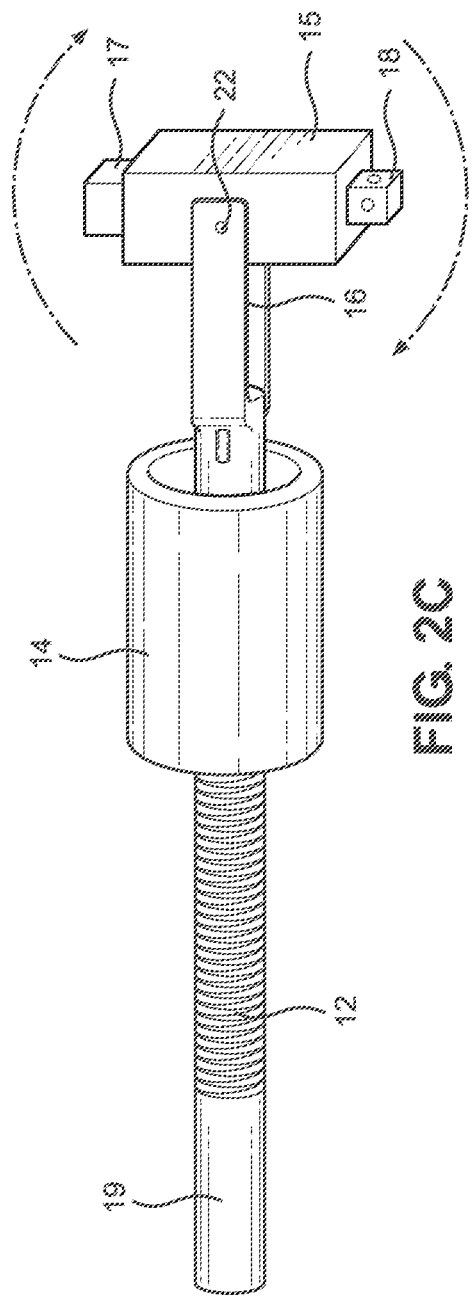
FIG. 2C shows a perspective view of an embodiment of the tool adapter with the collar in a detached position and the pivoting connector rotating.

FIG. 2C shows a perspective view of an embodiment of the tool adapter with the collar in a detached position and the pivoting connector rotating. When the collar 14 is slid along the elongated shaft 12 towards the attaching end 19, the pivoting connector 15 may freely rotate about the connecting point 22. The connecting point 22 keeps the pivoting connector 15 affixed to the pair of parallel arms 16. The user may rotate the pivoting connector 15 in order to position either the first socket adapter 18 or the second socket adapter 17 in a useable position. The user may position the pivoting connector 15 accordingly, whether the tool adapter 11 is connected to a power tool, or not.

Figure 2D:
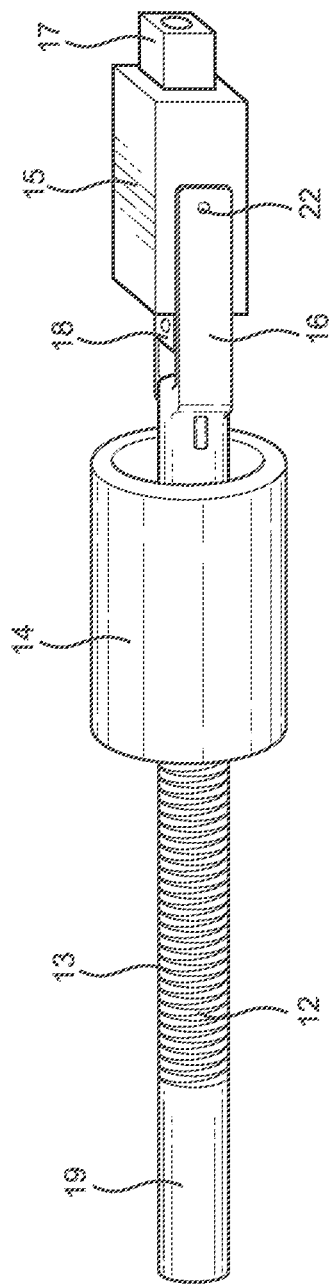
FIG. 2D shows a perspective view of an embodiment of the tool adapter with the collar in a detached position.

FIG. 2D shows a perspective view of an embodiment of the tool adapter with the collar in a detached position. When the user rotates the pivoting connector 15 so that the desired socket is in the useable position, the desired socket adapter will be at the most distal point of the tool adapter 11 with respect to the attaching end 19. When the desired adapter is at the most distal point from the attaching end 19, the user may stop rotating the pivoting connector 15 about the connecting point 22 on the pair of parallel arms 16. The user may also release the collar 14 and the spring 13 will adjust the collar 14 accordingly along the elongated shaft 12. In the shown embodiment, the second socket adapter 17 is in the usable position and the first socket adapter 18 is in a stored position.

Figure 2E:
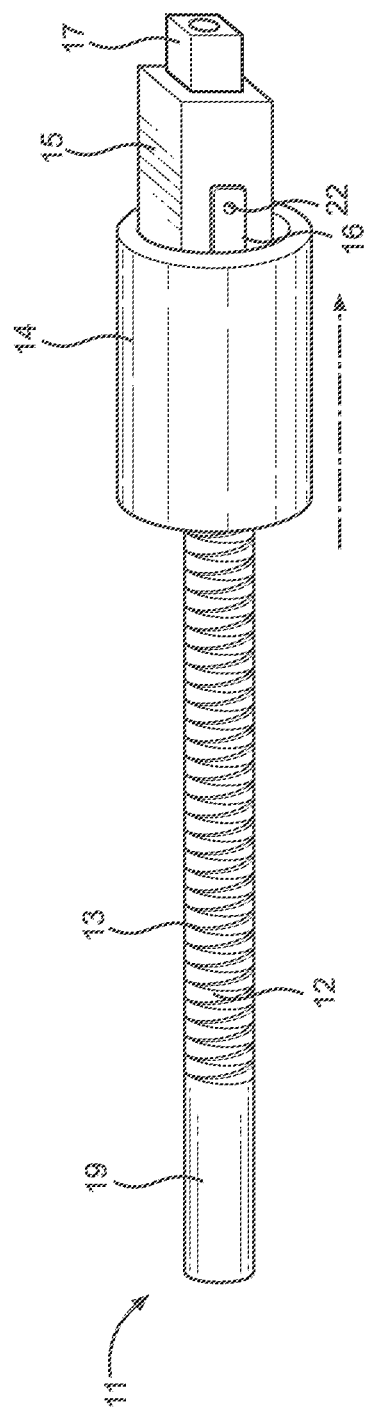
FIG. 2E shows a perspective view of an embodiment of the tool adapter with the collar in a locked position.

FIG. 2E shows a perspective view of an embodiment of the tool adapter with the collar in a locked position. When the desired socket adapter is selected the user may release the collar 14. Releasing the collar 14 will result in the spring 13 expanding along the elongated shaft 12. The attaching end 19 will remain exposed in order to connect the tool adapter 11 to a power tool. As the spring 13 expands, the collar 14 will slide along the elongated shaft 12 until the collar 14 is encasing the unused socket connector. In the shown embodiment, the second socket connector 17 is ready to be used. The collar 14 will engage with the one or more removable locking pins. The one or more removable locking pins will secure the collar 14 in place during use. When the collar 14 is secured, the pivoting connector 15 will be unable to rotate about the connecting point 22 on the pair of parallel arms 16.

Figure 3:
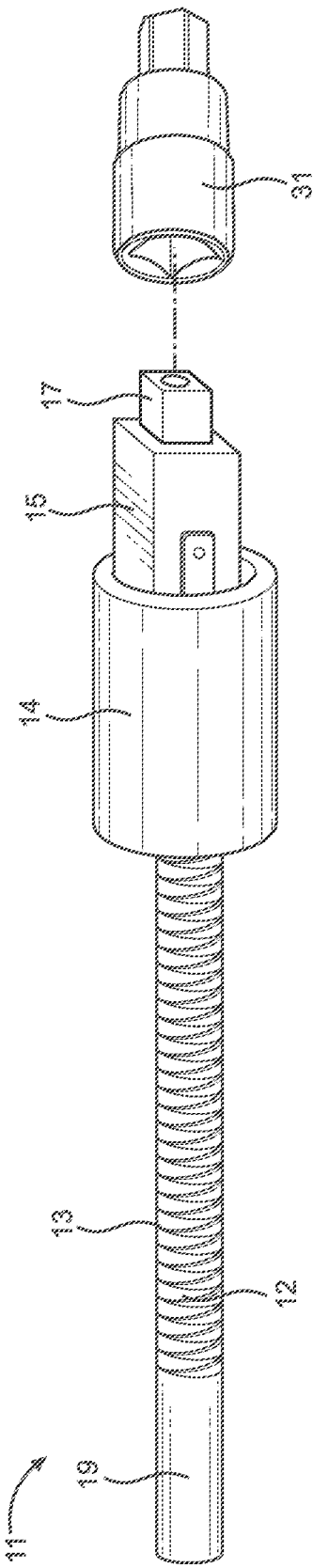
FIG. 3 shows an exploded view of an embodiment of the tool adapter in use.

FIG. 3 shows an exploded view of an embodiment of the tool adapter in use. In use, the tool adapter 11 will engage with a power tool. The power tool will connect with the tool adapter 11 at the attaching end 19. The user may slide the collar 14 along the elongated body 12, compressing the spring 13, before the tool adapter 11 is connected to a power tool or after the tool adapter 11 is connected to a power tool. When the user selects the desired socket connector on the pivoting connector 15, the tool adapter 11 may be used. In the shown embodiment, the second socket connector 17 is the desired socket connector. The user may then have a desired socket 31 engage with the desired socket connector 17. When the desired socket 31 is coupled to the desired socket connector 17, the user may engage the desired socket 31 with the nut or bolt that they want to loosen or tighten. They will operate the power tool to rotate the tool adapter 11 about an axis colinear with the elongated body 12.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tool adapter, comprising:
an elongated shaft having an attaching end and a working end;
a spring partially encircling the elongated shaft;
a collar coaxially disposed over the elongated shaft;
a pair of parallel arms disposed on opposing sides of the working end of the elongated shaft;
a pivoting connector pivotally affixed between the pair of parallel arms, via a connecting point;
a plurality of socket adapters disposed on the pivoting connector;
one or more removable locking pins securing the collar in a locked position;
wherein the collar is in the locked position when the collar partially encases the pivoting connector;
wherein the collar is in a detached position when the collar slides along the elongated shaft;
wherein the collar is coupled to the spring;
wherein the spring biases the collar towards the working end of the elongated shaft;
wherein sliding the collar compresses the spring towards the attaching end of the elongated shaft;
wherein the collar further comprises a base, an open end, and a sidewall;
wherein the base is oriented towards the spring;
wherein the base of the collar includes a plurality of apertures disposed thereon; and
wherein a first aperture encircles the elongated shaft, a second aperture is configured to receive a first removable locking pin, and a third aperture is configured to receive a second removable locking pin.

2. The tool adapter of claim 1, wherein the collar retains the pivoting connector and the elongated shaft in linear alignment.

3. The tool adapter of claim 1, wherein the pivoting connector freely rotates between the pair of parallel arms at the connecting point, when the collar is slid towards the attaching end.

4. The tool adapter of claim 1, wherein the attaching end of the elongated shaft engages with a power tool.

5. The tool adapter of claim 1, wherein a first socket adaptor of the socket adapters and a second socket adaptor of the socket adapters includes different sizes.

6. The tool adapter of claim 5, wherein the first socket adaptor of the socket adapters is a ¼-inch socket and the second socket adaptor of the adapters is a ⅜-inch socket.

* * * * *